United States Patent [19]

Jani

[11] Patent Number: 5,675,595
[45] Date of Patent: Oct. 7, 1997

[54] COMPOSITE MULTIPLE WAVELENGTH LASER MATERIAL AND MULTIPLE WAVELENGTH LASER FOR USE THEREWITH

[75] Inventor: Mahendra G. Jani, Poquoson, Va.

[73] Assignee: Science and Technology Corporation, Hampton, Va.

[21] Appl. No.: 593,445

[22] Filed: Jan. 29, 1996

[51] Int. Cl.⁶ .................................................. H01S 3/10
[52] U.S. Cl. ........................ 372/23; 372/105; 372/92; 372/66
[58] Field of Search ........................ 372/41, 66, 92, 372/105, 23

[56] References Cited

U.S. PATENT DOCUMENTS

| | | | |
|---|---|---|---|
| 4,507,787 | 3/1985 | Daly et al. | 372/66 |
| 4,682,335 | 7/1987 | Hughes | 372/66 |
| 5,287,373 | 2/1994 | Rapoport et al. | 372/41 |
| 5,321,711 | 6/1994 | Rapoport et al. | 372/41 |
| 5,394,420 | 2/1995 | Senn et al. | 372/66 |
| 5,441,803 | 8/1995 | Meissner | |
| 5,563,899 | 10/1996 | Meissner et al. | 372/66 |

*Primary Examiner*—Leon Scott, Jr.
*Attorney, Agent, or Firm*—Peter J. Van Bergen

[57] ABSTRACT

A composite multiple wavelength laser material is provided and is typically constructed with a common axis of construction in the form of a rod of uniform cross-section. The rod comprises a plurality of segments of laser material bonded, e.g., diffusion bonded, to one another along the common axis. Each segment lases at a unique wavelength when excited to produce a laser emission. The segments can be made from a birefringent material doped with laser active ions. If the same birefringent host material is used for all segments, ground-state absorption losses can be reduced by terminating either end of the rod with end segments made from undoped pieces of the birefringent material.

20 Claims, 2 Drawing Sheets

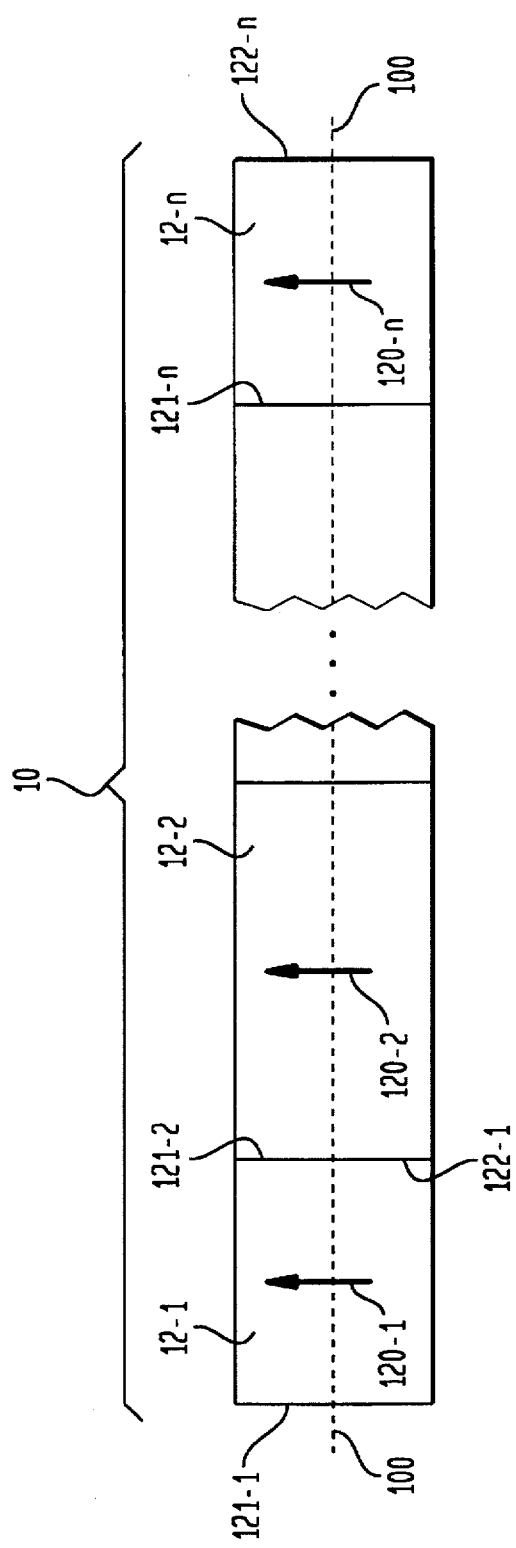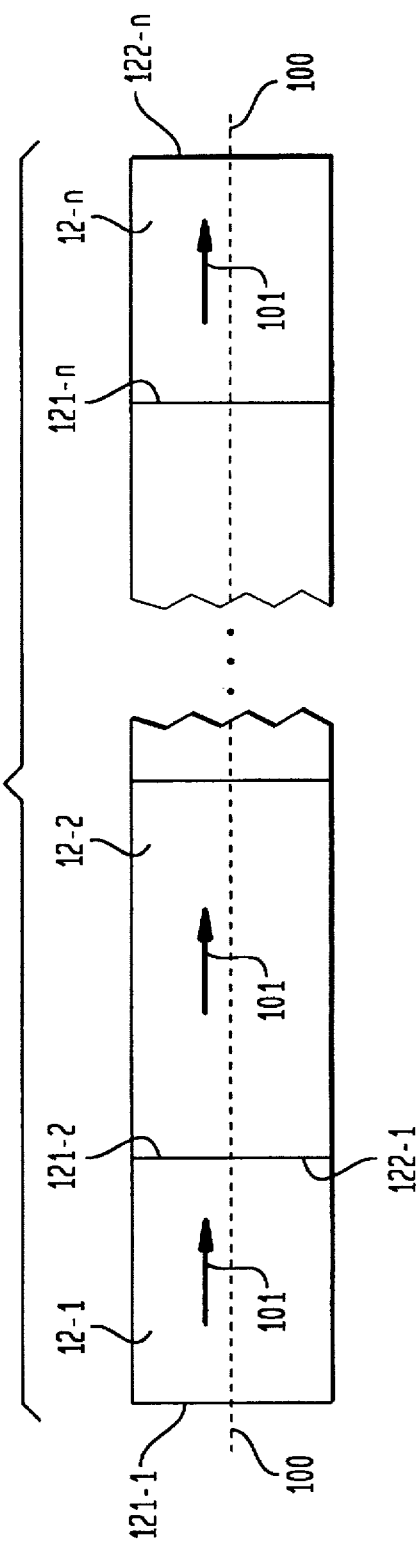

COMPOSITE MULTIPLE WAVELENGTH LASER MATERIAL AND MULTIPLE WAVELENGTH LASER FOR USE THEREWITH

STATEMENT OF GOVERNMENT INTEREST

This invention was made with Government support under contract NAS1-19603 awarded by NASA. The Government has certain rights in this invention.

CROSS-REFERENCE TO RELATED PATENT APPLICATIONS

This patent application is related to co-pending patent application entitled "COMPOSITE LASER MATERIAL AND LASER THEREFOR", Ser. No. 08/593,444, filed on Jan. 29, 1996.

FIELD OF THE INVENTION

The invention relates generally to lasers, and more particularly to a composite laser material capable of lasing at multiple wavelengths and the multiple wavelength laser that uses the composite laser material.

BACKGROUND OF THE INVENTION

Medical and other scientific laser applications are increasingly requiring the use of more than one lasing wavelength in the performance of the application. This requires the use of a separate laser apparatus for each wavelength needed. This, of course, adds to the expense and feasibility of performing the application.

SUMMARY OF THE INVENTION

Accordingly, it is an object of the present invention to provide a laser material and apparatus capable of generating multiple wavelengths of laser light.

Other objects and advantages of the present invention will become more obvious hereinafter in the specification and drawings.

In accordance with the present invention, a multiple wavelength laser rod is placed in a laser cavity defined by reflective elements aligned on a common axis to form a reflective path therebetween. The rod comprises a plurality of segments of laser material bonded, e.g., diffusion bonded, to one another along the common axis. Each segment lases at a unique wavelength when excited to produce a laser emission. For segments made from a birefringent material doped with laser active ions, the optic axes of each segment must have the same angular orientation, i.e., parallel to one another or aligned with one another. If the same birefringent host material is used for all segments, ground-state absorption losses can be reduced by terminating either end of the rod with end segments made from undoped pieces of the birefringent host material. The optic axes of the undoped end segments must have the same angular orientation as the doped segments.

BRIEF DESCRIPTION OF THE DRAWINGS

FIG. 1 is a side view of one construction of the composite multiple wavelength laser material of the present invention in which the optic axes of the material's segments are parallel to one another;

FIG. 2 is a side view of another construction of the composite multiple wavelength laser material of the present invention in which the optic axes of the material's segments are aligned with one another;

DETAILED DESCRIPTION OF THE INVENTION

Figure 3:
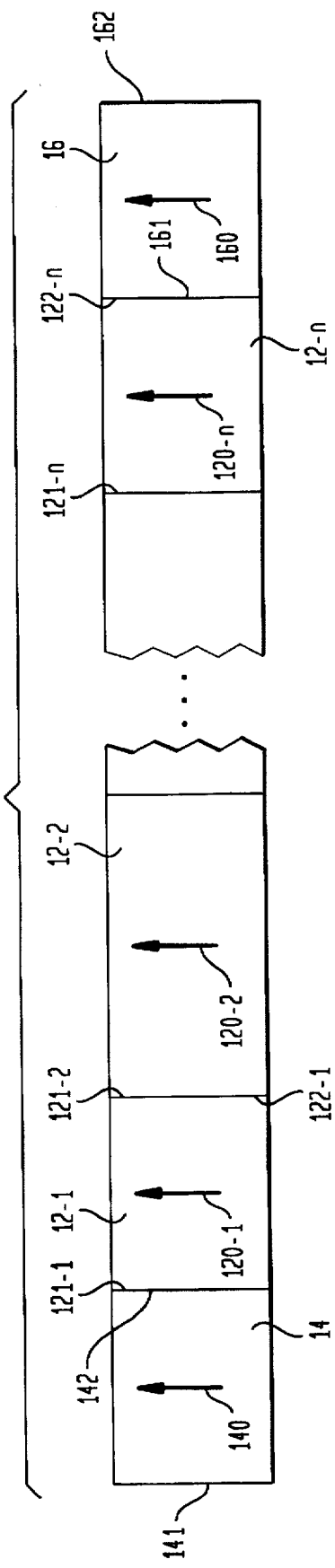
FIG. 3 is a side view of still another construction of the composite multiple wavelength laser material of the present invention that further includes end segments of undoped host material to reduce ground-state absorption losses.

Referring now to the drawings, and more particularly to FIG. 1, one construction of the composite laser material according to the present invention is shown and referenced generally by numeral 10. For purpose of illustration, it will be assumed that composite laser material 10 is formed in the shape of a rod of square, circular, or other suitable cross-section. Regardless of shape, composite laser rod 10 is of uniform cross-section along the length thereof to simplify its construction and use as will be described in detail below.

Composite laser rod 10 is formed from rod segments 12-1, ..., 12-n. Each of segments 12-1, ..., 12-n is constructed to produce a laser beam of unique wavelength when optically energized. Each of segments 12-1, ..., 12-n is formed from a host material that has been doped with laser active ions. The laser active ions are defined herein as the ions doped in the host material that cause the particular segment to lase when optically energized. Suitable laser active ions are rare earth ions such as holmium (Ho), erbium (Er), neodymium (Nd) and thulium (Tm), transition metal ions such as chromium (Cr), and combinations of the rare earth and transition metal ions.

The same or different host material can be used for each of segments 12-1, ..., 12-n. Host materials for segments 12-1, ..., 12-n include single-crystal uniaxial or biaxial birefringent materials such as $YAlO_3$, $Y_2SiO_5$, YLF, $YLuLiF_4$, $LuLiF_4$, LiCAF, LiSAF, LiSGAF, $BaY_2F_8$, etc. However, the present invention is not so limited as other possible host materials include crystals such as $Lu_3Al_5O_{12}$, GSGG, YSAG, YSGG, etc.

In some instances it has been found that a birefringent host material yields lower upconversion losses. Further, since birefringent materials have an optic axis that requires proper alignment in the present invention, the remainder of the description will focus on the construction of a composite multiple wavelength laser material using a birefringent host material. For other host materials, the construction details related to optic axes are not applicable.

When each of segments 12-1, ..., 12-n is a birefringent material, each segment has a "c" or optic axis. For the present invention, the optic axes of birefringent segments 12-1, ..., 12-n must have the same angular orientation. This can be realized by either having the optic axes of segments 12-1, ..., 12-n parallel to one another or in alignment with one another. In FIG. 1, the "c" or optic axis of segments 12-1, ..., 12-n are parallel to one another. More specifically, optic axis 120-1 of segment 12-1 is parallel with optic axis 120-2 of segment 12-2 which, in turn, is parallel with each of the other optic axes through segment 12-n. Each segment is fabricated so that its end faces are parallel to that segment's optic axis to prevent reflection losses at the interfaces between adjoining ends of the segments. For example, the mating end faces 122-1 and 12-1-2 of segments 12-1 and 12-2, respectively, are parallel to optic axes 120-1 and 120-2. The free end faces of composite laser rod 10, i.e., 121-1 and 122-n, can be fabricated to be parallel to the optic axis of the respective segment. However, as is known in the art, free end faces 121-1 and 122-n could also be formed as opposite wedges of slight angle (e.g., 30 minutes) with respect to mating faces 122-1 and 121-n, respectively, in order to minimize back reflection. Free end faces 121-1 and 122-n could further be coated with an anti-reflection coating at the multiple wavelengths.

To achieve such optic axis alignment, all segments of composite laser rod 10 could conceivably be grown simultaneously although the difficulty, time and expense of doing so makes such a fabrication impractical. Accordingly, in the preferred embodiment, each of segments 12-1, . . . , 12-n is fabricated by itself, and the segments are optically coupled/bonded to one another along a common axis of construction 100. To minimize optical losses at the bonding planes between the segments, it is further preferred to avoid the use of dissimilar materials in laser rod 10. Thus, it is preferable to bond segments 12-1, . . . , 12-n without the use of bonding agents. One method of achieving this is by diffusion bonding the segments in accordance with, for example, the methodology taught by Meissner in U.S. Pat. No. 5,441,803.

As mentioned above, another construction for the composite laser rod of the present invention has the optic axes of segments 12-1, . . . , 12-n aligned with one another to define a common optic axis 101 that is aligned with common axis of construction 100. Such a construction is shown in FIG. 2 where like references are used for those elements in common with the construction in FIG. 1. Common optic axis 101 is perpendicular to each of the mating faces, e.g., 122-1, 121-2, etc. As in the first embodiment, the free end faces 121-1 and 122-n can be perpendicular to optic axis 101 or could be formed as opposite wedges of slight angle with respect to mating faces 122-1 and 122-n, respectively, in order to minimize back reflection. In the construction of FIG. 2, free end faces 121-1 and 122-n could also be coated with an anti-reflection coating at the lasing wavelength of the respective segment.

The lengths of each of segments 12-1, . . . , 12-n can be the same or vary depending on factors such as the amount of energy required at each of the unique lasing wavelengths, the type of laser apparatus (e.g., end-pumped or transversely pumped), the laser pump head design, the requirements of the laser's support and/or cooling system, etc. For example, in a transversely pumped laser, a segment's length can be adjusted to provide more or less pumping area to produce a higher or lower powered laser at the segment's lasing wavelength. In an end-pumped laser, pumping efficiency may limit the length of each segment.

Since the laser apparatus for high-power lasers is most often of the actively cooled (e.g., liquid-cooled) variety, a portion of either end of the laser rod is required for support and coolant seals. For transversely pumped lasers, these end portions of the laser rod cannot be pumped. More importantly, ground-state absorption losses in these unpumped end portions greatly detract from laser efficiency. This is especially true in quasi-three or quasi-four level lasers. In addition, the absorption losses generate thermal stresses which, at the points of support, can lead to breakage of the laser rod. Accordingly, the construction of the present invention's composite multiple wavelength laser rod shown in FIGS. 1 and 2 can be adapted to reduce ground-state absorption losses in the following fashion.

In FIG. 3, the composite multiple wavelength laser rod shown in FIG. 1 has been adapted to reduce ground-state absorption losses. (An analogous adaptation could be accomplished for the construction shown in FIG. 2.) In the embodiment shown in FIG. 3, each of segments 12-1, . . . , 12-n is formed from the same birefringent host material that is uniquely doped for lasing at a unique wavelength. End segments 14 and 16 are also formed from the same birefringent host material except that each of segments 14 and 16 remain undoped. In general, the formulation of segments 12-1, . . . , 12-n in the construction of FIG. 3 is X:Y where Y represents the same birefringent host material and X represents the unique doping combination and/or concentration of laser active ions doped in Y that yields a unique lasing wavelength for each segment. The formulation for each end segment 14 and 16 is Y or the undoped birefringent host material. Possible host materials include single-crystal birefringent materials such as $YAlO_3$, $Y_2SiO_5$, YLF, $YLuLiF_4$, $LuLiF_4$, LiCAF, LiSAF, LiSGAF, $BaY_2F_8$, etc.

Since end segments 14 and 16 are made from the birefringent host material, their optic axes must be properly aligned when bonded, e.g., diffusion bonded, to segments 12-1 and 12-n, respectively. In the case of the construction shown in FIG. 3, optic axis 140 of end segment 14 is parallel with optic axis 120-1 which, in turn, is parallel with optic axis 160 of end segment 16. To prevent reflection losses at the interfaces between the undoped end segments 14 and 16, and the doped segments 12-1 and 12-n, respectively, mating faces 142, 121-1, 122-n and 161 are parallel to optic axes 140, 120-1, etc. The free end faces 141 and 162 of end segments 14 and 16, respectively, can be parallel to optic axes 140 and 160 or can be formed as opposite wedges of slight angle (e.g., 30 minutes) with respect to mating faces 142 and 161.

Figure 4:
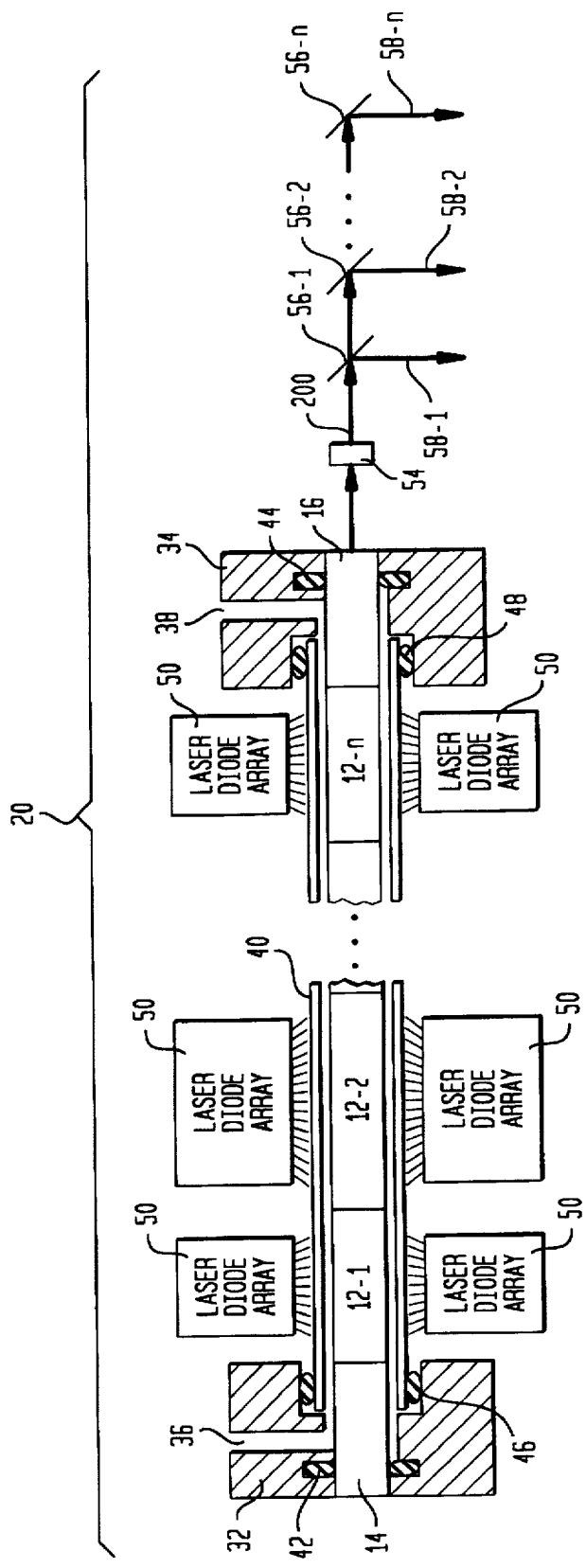
FIG. 4 is a cross-sectional view of a transversely pumped, actively cooled, multiple wavelength laser apparatus including the composite multiple wavelength laser rod constructed in accordance with the present invention.

FIG. 4 depicts a multiple wavelength laser 20 constructed in accordance with the present invention. By way of example, laser 20 is a transversely pumped, actively cooled laser. Laser 20 includes a laser rod housing for supporting the composite laser rod (formed by segments 14, 12-1, . . . , 12-n and 16) at positions along each of end segments 14 and 16. More specifically, end housing 32 supports end segment 14 and end housing 34 supports end segment 16. End segments 14 and 16 must be long enough to be fully supported by the laser's support and cooling arrangement.

Laser 20 must also define a coolant flow path about, and in contact with, the multiple wavelength composite laser rod in order to cool same during operation of laser 20. Accordingly, end housings 32 and 34 are provided with coolant inlet 36 and outlet 38, respectively. A glass sleeve or jacket 40 surrounds the portion of the composite laser rod that spans between end housings 32 and 34 to define a coolant path between coolant inlet 36 and outlet 38. To prevent leakage of any cooling liquid, O-ring seals 42 and 44 fit snugly between respective end housings 32 and 34 and the undoped end segments 14 and 16. Glass jacket 40 is similarly sealed in end housings 32 and 34 by O-ring seals 46 and 48. A similar support and cooling structure could be used in an end-pumped laser apparatus. However, in an end-pumped laser, the relative length of segments 12-1, . . . , 12-n would typically be reduced for laser efficiency and the laser rod housing would completely enclose the glass sleeve since pumping of the rod occurs at an end thereof.

In the case of transversely pumped laser 20, one or more laser diode arrays 50 are placed about-the circumference and along the length of each of segments 12-1, . . . , 12-n. As mentioned above, the length of each segment and number of laser diode arrays associated with each segment can be varied to adjust the power of each lasing wavelength. By using undoped end segments 14 and 16, the entire length of each of segments 12-1, . . . , 12-n can be pumped. The multiple wavelength composite laser rod having end segments 14 and 16 is placed between a pair of aligned reflective elements or mirrors 52 and 54, or other laser cavity forming means, to form a resonator having a common axis of alignment, i.e., common axis of construction 100. Reflective element 52 is substantially or totally reflective to each lasing wavelength while reflective element 54 (e.g., an optic coupler) is more transmissive to the wavelengths of the output laser emission. For laser 20 to provide multiple wavelengths, reflective elements 52 and 54 must have multiple coatings corresponding to the lasing wavelengths of segments 12-1, . . . , 12-n. The resulting multiple wavelength laser beam transmitted by reflective element 54 is referenced by numeral 200. Beam 200 is intercepted by a corresponding number of specially coated reflectors 56-1, . . . 56-n. Each reflector 56-1, . . . , 56-n is coated to be reflective at the wavelength associated with the respective one of segments 12-1, . . . . 12,n, while being transmissive to all other wavelengths. As a result, multiple unique-wavelength laser beams 56-1, . . . , 56-n are simultaneously produced by a single laser apparatus.

The advantages of the present invention are numerous. The multiple wavelength laser material and apparatus therefor will allow a single laser device to produce multiple laser beams of unique wavelength and power. In the embodiment including undoped end segments, ground-state absorption losses are reduced. As a result, the composite multiple wavelength laser rod can be productive at higher pulse repetition frequencies while not being subject to thermal stresses where it is physically supported in the laser housing. Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed and desired to be secured by Letters Patent of the United States is:

1. A multiple wavelength laser rod for placement in a laser cavity defined by reflective elements aligned on a common axis to form a reflective path therebetween, said multiple wavelength laser rod comprising a plurality of segments of laser material bonded to one another along said common axis, each of said plurality of segments having a host material that is the same and that is doped to lase at a unique wavelength when pumped to produce a multiple wavelength laser beam transmitted along said common axis.

2. A multiple wavelength laser rod as in claim 1 wherein said host material is a birefringent material.

3. A multiple wavelength laser rod as in claim 1 wherein said laser active ions are selected from the group consisting of rare earth ions, transition metal ions, and combinations thereof.

4. A multiple wavelength laser rod as in claim 1 wherein said common axis passes through a first end of said plurality of segments and passes through a second end of said plurality of segments, and further comprising:

a first end segment of said host material in its undoped form bonded to said first end of said plurality of segments; and a second end segment of said host material in its undoped form bonded to said second end of said plurality of segments.

5. A composite laser material as in claim 4 wherein said first end segment has an optic axis, said second end segment has an optic axis, and each of said plurality of segments has an optic axis, and wherein each said optic axis has the same angular orientation.

6. A composite laser material as in claim 5 wherein each said optic axis is parallel to said common axis.

7. A composite laser material as in claim 5 wherein each said optic axis is transverse to said common axis.

8. A multiple wavelength laser rod as in claim 1 wherein said rod is of uniform cross-section along the length thereof.

9. A multiple wavelength laser rod for placement in a laser cavity defined by reflective elements aligned on a common axis to form a reflective path therebetween, said multiple wavelength laser rod comprising a plurality of rod segments of birefringent laser material having a uniform cross-section diffusion bonded to one another along said common axis, each of said plurality of rod segments having an optic axis of the same angular orientation, each of said plurality of rod segments having a host material that is the same and that is doped to lase at a unique wavelength when pumped to produce a multiple wavelength laser beam transmitted along said common axis.

10. A multiple wavelength laser rod as in claim 9, wherein said laser active ions are selected from the group consisting of rare earth ions, transition metal ions, and combinations thereof.

11. A multiple wavelength laser rod as in claim 9, wherein said common axis passes through a first end of said plurality of rod segments and passes through a second end of said plurality of rod segments, and further comprising:

a first end segment of said host material in its undoped form bonded to said first end of said plurality of rod segments, said first end segment having an optic axis with the same angular orientation as said optic axes of said plurality of rod segments; and a second end segment of said host material in its undoped form bonded to said second end of said plurality of rod segments, said second end segment having an optic axis with the same angular orientation as said optic axes of said plurality of rod segments.

12. A multiple wavelength laser rod as in claim 11, wherein said optic axes of said plurality of rod segments, said first end segment and said second end segment are parallel to one another and perpendicular to said common axis.

13. A multiple wavelength laser rod as in claim 11, wherein said optic axes of said plurality of rod segments, said first end segment and said second end segment are aligned with said common axis.

14. A multiple wavelength laser rod as in claim 9, wherein said optic axes of said plurality of rod segments are parallel to one another and perpendicular to said common axis.

15. A multiple wavelength laser rod as in claim 9, wherein said optic axes of said plurality of rod segments are aligned with said common axis.

16. A multiple wavelength laser comprising:

a laser cavity defined by a first reflective element opposing a second reflective element, said first reflective element and said second reflective element being aligned on a common axis to form a reflective path therebetween;

a plurality of rod segments of birefringent laser material having a uniform cross-section along the length thereof and being diffusion bonded to one another along said common axis wherein said common axis passes through a first end of said plurality of rod segments and passes through a second end of said plurality of rod segments, each of said plurality of rod segments having an optic axis of the same angular orientation, each of said plurality of rod segments having a host material that is the same and that is doped to lass at a unique wavelength when pumped;

a first end segment of said birefringent laser material in its undoped form having said uniform cross-section along the length thereof and being diffusion bonded to said first end of said plurality of rod segments, said first end segment having an optic axis with the same angular orientation as said optic axes of said plurality of rod segments;

a second end segment of said birefringent laser material in its undoped form having said uniform cross-section along the length thereof and being diffusion bonded to said second end of said plurality of rod segments, said second end segment having an optic axis with the same angular orientation as said optic axes of said plurality of rod segments;

at least one optical energy source optically coupled to said plurality of rod segments for pumping optical energy into said plurality of rod segments, wherein each of said plurality of rod segments lases at a unique wavelength when pumped by said optical energy to thereby produce a multiple wavelength laser beam along said common axis; and a plurality of reflectors distributed along said common axis, each of said plurality of reflectors reflecting one of each said unique wavelength of said multiple wavelength laser beam, wherein a plurality of unique-wavelength laser beams are produced in correspondence with said plurality of rod segments.

17. A multiple wavelength laser as in claim 16, wherein said laser active ions are selected from the group consisting of rare earth ions, transition metal ions, and combinations thereof.

18. A multiple wavelength laser as in claim 16, wherein said optic axes of said plurality of rod segments, said first end segment and said second end segment are parallel to one another and perpendicular to said common axis.

19. A multiple wavelength laser as in claim 16, wherein said optic axes of said plurality of rod segments, said first end segment and said second end segment are aligned with said common axis.

20. A multiple wavelength laser as in claim 16, wherein said at least one optical energy source comprises a plurality of optical energy sources for pumping said optical energy into said plurality of rod segments from a direction transverse to said common axis.

* * * * *